United States Patent [19]
Lester et al.

[11] 3,896,439
[45] July 22, 1975

[54] MULTI-SPOT RADAR JAMMING SYSTEM

[75] Inventors: John M. Lester, Garden City; Philip W. Crist, Roslyn Heights; Charles E. O'Toole, Whitestone, all of N.Y.

[73] Assignee: Sperry Rand Corporation, New York, N.Y.

[22] Filed: Oct. 31, 1955

[21] Appl. No.: 543,647

[52] U.S. Cl. ............................................. 343/18 E
[51] Int. Cl.² .......................................... H04K 3/00
[58] Field of Search ........... 250/15, 15 T, 17, 20.52, 250/17.10, 17.12, 17.414, 6.1, 6.46; 343/18 E

[56] References Cited
UNITED STATES PATENTS
1,397,093  11/1921  Espenschied .......................... 250/15
1,968,460  7/1934  Llewellyn ........................... 250/20.52
2,269,011  1/1942  Dallos ............................... 250/20.52
2,425,315  8/1947  Atwood ............................. 250/20.52

FOREIGN PATENTS OR APPLICATIONS
1,025,091  1/1953  France ................................. 250/15

*Primary Examiner*—Malcolm F. Hubler
*Attorney, Agent, or Firm*—Howard P. Terry

EXEMPLARY CLAIM

1. A jamming system comprising a broad band noise source, means for channelizing the output of the noise source into a plurality of output channels of different frequencies, broad band transmitting means, means including a plurality of switches, each switch selectively coupling a respective one of said output channels to said transmitting means, broad band signal receiving means, and means for selectively actuating each said switch in response to received signals of a frequency coextensive with that of said respective one of said output channels.

8 Claims, 2 Drawing Figures

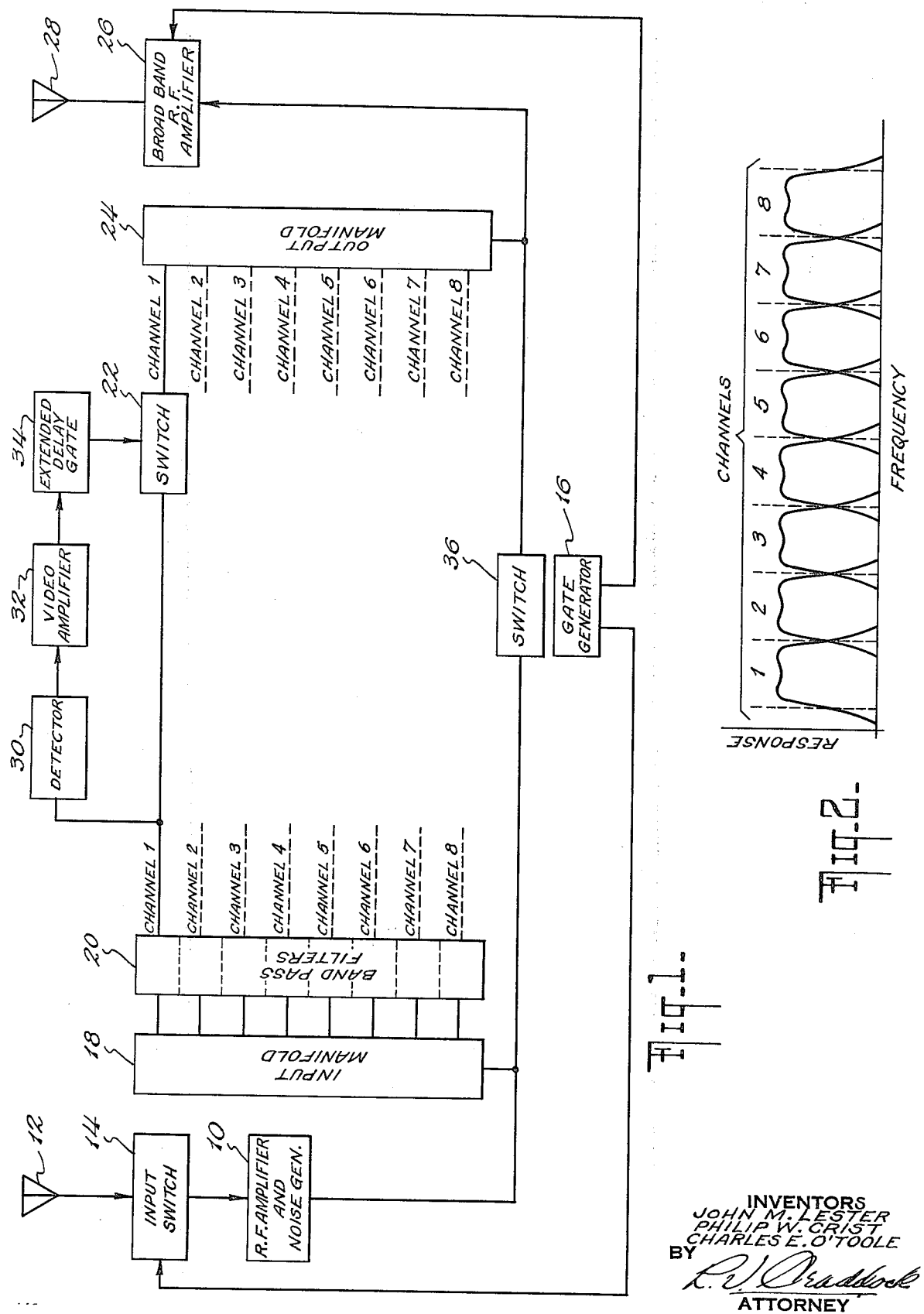

MULTI-SPOT RADAR JAMMING SYSTEM

The invention herein described was made in the course of or under a contract or subcontract thereunder, with the Department of the Air Force.

This invention relates to an improved radar jamming system, and more particularly, is concerned with a multi-spot non-scan type of jammer.

One well known technique of effecting jamming of an enemy radar, for example, is to beam a noise signal to the enemy receiver of such magnitude as to substantially obliterate any received signal, such as an echo or target return. By effectively reducing the signal-to-noise ratio at the enemy receiver by this means, the enemy is unable to distinguish target return from the noise. One problem encountered in this type of jamming technique is that the enemy is able to operate his radar at any selected frequency within an extremely wide band of frequencies. This means that in order to jam an enemy receiver at random, the jamming signal would have to contain all the frequencies within the band. Attempts to jam at all frequencies simultaneously means that the amount of power available for jamming at any given frequency becomes quite limited. It is therefore generally desirable to try to ascertain first the frequency at which the enemy radar is operating and then to send out a jamming signal at that frequency.

The general method of carrying out selective jamming has been to utilize a frequency scanning type receiver or microwave spectrum analyzer to ascertain the frequency of enemy radar signals. A jamming transmitter is then tuned to the frequency of the enemy radar and a jamming signal transmitted. Generally the transmitter is interrupted periodically so that the spectrum analyzer can re-check to see that the enemy radar has not shifted frequency for the purpose of avoiding the jamming. This technique is commonly referred to as "look through", since the receiver is permitted to look through the jamming signal at the enemy radar signals.

Such known jamming systems have the disadvantage that they are not fully automatic in their operation but require the intervention of an operator to tune the jammer to selected frequencies as detected by the spectrum analyzer. Furthermore, such systems are relatively slow because of the scanning and tuning operations involved. Moreover, such systems are not readily adapted to jamming of a number of enemy radar systems operating at different frequencies simultaneously.

It is the general object of the present invention to avoid and overcome the foregoing and other difficulties in and objections to the prior art practices by the provision of improved jamming apparatus that is simpler and more compact in construction, easier to operate, and more versatile in performance.

Another object of this invention is the provision of jamming apparatus that is completely automatic in its operation.

Another object of this invention is to provide jamming apparatus that selectively jams at several frequencies simultaneously.

Another object of this invention is the provision of jamming apparatus which checks all frequencies over a very wide frequency band simultaneously and instantaneously during "look through."

Another object of this invention is the provision of jamming apparatus which selectively jams, according to frequency, enemy radar situated at short range while providing barrage jamming over a wide frequency band for enemy radar situated at more remote distances.

These and other objects of the invention which will become apparent as the description proceeds are achieved by a multi-spot, non-scan jamming system which utilizes broad band receiving means and broad band transmitting means which are alternately gated on and off. A plurality of band pass filters tuned respectively to different frequency channels are coupled to the output of the receiving means for channelizing the received signals, during the "look-through" interval, according to frequency. Means is provided for coupling only those filters passing frequencies present in the received signals to the input of the transmitting means during the transmitting interval. The receiving means acts as a broad band noise source during the transmitting interval, so that signals at selected frequencies, as determined by the particular filters coupled to the input of the transmitting means, drive the transmitting means to produce jamming signals at the same frequencies as the received enemy radar signals.

For a better understanding of the invention reference should be had to the accompanying drawing, wherein:

FIG. 1 is a block diagram of the jamming system of the present invention; and

FIG. 2 is a diagram showing the channelized frequency response of the system.

Referring to FIG. 1, the numeral 10 indicates generally an r.f. broad band amplifier. The amplifier 10 preferably comprises several cascaded travelling wave tube stages, travelling wave tubes being preferred because of their broad band performance characteristic.

Received energy is coupled to the r.f. amplifier 10 by means of an antenna 12, the antenna being connected to the input of the r.f. amplifier 10 through a suitable input switch 14. The switch 14 may be of any suitable broad band microwave switch type that can be gated on and off by an external voltage pulse, such, as for exmple, the switch disclosed in U.S. Pat. No. 2,557,961. The external pulse for operating the input switch 14 is derived from a gate generator 16, which produces gating pulses at preselected intervals. While a separate input switch has been described in the preferred embodiment, the switching operation may be achieved alternatively by gating on and off the first stage of the r.f. amplifier 10.

Enemy radar signals which are picked up by the antenna 12 and amplified by the r.f. amplifier 10 are coupled to an input manifold 18. The manifold 18 acts to divert energy from the output of the amplifier 10 into a plurality of channels of which eight are shown by way of example. Each of the output channels from the input manifold 18 is connected to a band pass filter, the band pass filter for all channels being indicated generally at 20. Each of the band pass filters associated with the several output channels of the manifold 18 is tuned to a separate frequency band. This technique of channelizing a received signal according to its frequency content is well known and is generally referred to in the art as multiplexing. Suitable means for performing this multiplexing function comprising the manifold 18 and band pass filters 20 is described in U.S. Pat. No. 2,686,902. Thus, any enemy radar signal received while the switch 14 is gated open by the gate generator 16 is amplified and channelized into one or more of the output channels from the band pass filters 20 as determined by the frequency of the enemy radar signal. The diagram of FIG. 2 shows the frequency response curves of the band pass filters.

Each frequency channel as derived from the band pass filters 20 is coupled through a switch 22 to an output manifold 24. The switch 22 is gated on, in a manner hereinafter more fully described, for a predetermined period of time following the reception of a signal at the frequency of the associated channel. For simplicity and clarity only the switch and associated circuit in channel 1 are shown in the drawing, it being understood that identical switching means is provided in each of the channels for coupling between the band pass filters 20 and the output manifold 24.

The output manifold 24 is similar to the input manifold 18 but is operated in reciprocal fashion to combine signals of several frequencies as derived from two or more of the input channels to a single output. The combined output from the output manifold 24 in turn is coupled to a broad band r.f. amplifier 26. The amplifier 26 is similar to the amplifier 10 and preferably comprises several cascaded travelling wave tube stages, the output stage being coupled to a radiating antenna 28. The r.f. amplifier 26 is gated on and off by the gate generator 16, the gate generator 16 being arranged to gate on the amplifier 26 while the switch 14 is gated off, to provide time sharing between reception and transmission. The gate generator 16 may be an astable (free running) unsymmetrical type multivibrator having two conductive conditions whose intervals of persistence are in the ratio of, for example, 10:1. The short interval output gating pulse of the gate generator determines the look-through period of the received signal from the antenna 12.

The driving signals for the r.f. amplifier 26 are derived from the r.f. amplifier 10 acting as a noise generator. The amplifier 10, with input from the antenna 12 interrupted by the input switch 14, continuously generates thermal noise over the entire band covered by the band pass filters 20, so that each of the output channels from the band pass filters is energized during the transmission interval as set by the gate generator 16. By closing, i.e. rendering conductive, only those switches 22 in the channels in which enemy radar signals are received, signals of corresponding frequency are coupled to the amplifier 26 and radiated as jamming signals.

Each switch 22 is closed in response to a received signal above a predetermined threshold level in the frequency band of the associated channel. This is accomplished by means of a detector 30 which produces a video signal in response to received radar pulses in the associated channel. The output of the detector 30 is amplified by a video amplifier 32 and coupled to suitable extended delay gating circuit 34 for gating on the switch 22 for a predetermined time interval following the reception of an enemy radar signal. The gating circuit 34 includes a threshold circuit whereby the received video pulse signal must exceed a predetermined level before the gating circuit is triggered. The predetermined level of the threshold circuit is set at least high enough to preclude the fortuitous triggering of the gating circuit by the detected thermal noise output of amplifier 10. It will be recognized that it is not necessary to jam an enemy radar signal whose amplitude at the output of detector 30 fails to exceed the noise level at the same point. If the enemy radar signal is of the level of the noise in the jamming apparatus of FIG. 1, it will be substantially below the threshold of detectability in the enemy radar, considering that said radar signal suffers an additional loss upon reflection proportional to the square of the distance separating the jammer and the enemy radar. The gating circuit 34 is preferably arranged to hold the switch 22 closed as long as signals are being received at the frequency of the associated channel and to continue to hold the switch 22 closed for a predetermined period after reception of the signals ceases. If desired, this latter extended delay period can hold the switch closed for a period of time corresponding to the time an enemy searching radar might take to scan through 360°. In other words, it may be desirable to hold the switch 22 closed to provide continuous jamming during the complete scanning period of the enemy radar, even though signals are not being received continuously during this scanning interval. The extended delay gate circuit 34 preferably takes the form of a circuit described in copending application Ser. No. 545,292, filed Nov. 7, 1955, in the names of Kay H. Barney and Lawrence Greenspan, now U.S. Pat. No. 2,903,605, but alternatively may be in the form of a circuit described in copending application Ser. No. 504,710, filed Apr. 29, 1955, now U.S. Pat. No. 2,812,450, in the name of Kay H. Barney.

In operation, it will be seen from the above description that pulses received from enemy radar during the look-through interval, as set by the gate generator 16, are amplified and selected according to frequency by the band pass filters 20. The received radar pulses above a predetermined threshold level closed, i.e. render conductive one of the switches 22 associated with the channel corresponding in frequency to the received radar pulses. The switch 22 having been closed, with the gate generator 16 closing the input switch 14 and gating on the r.f. amplifier 26, energy derived from the r.f. amplifier 10 as a noise generator source is passed by the closed switch 22 to the r.f. amplifier 26. Thus, a driving noise signal at frequencies of the channel selected in response to the frequency of the received enemy radar pulses is provided, so that a jamming signal is radiated by the antenna 28 covering the same frequencies as the received enemy radar signal. If more than one radar is transmitting, each at a different frequency, two or more channels may be opened at one time. This results in jamming signals at corresponding frequencies being simultaneously transmitted from the transmitting antenna 28.

An additional feature of the present invention is that barage jamming, that is, jamming over a broad frequency band, may be simultaneously carried out. For example, a portion (say between one-third and two-thirds) of the output energy derived from the r.f. amplifier 10 as a noise generator source may be coupled directly, as by a switch 36, to the r.f. amplifier 26.

The switch 36 can either be manually or automatically operated. This type of enhanced barrage system is particularly effective when operating over a region where, because of the high enemy radar density, many channels would normally be turned on. In general, jamming effectiveness at any one frequency becomes somewhat less after approximately 5 channels have been turned on.

Since the required jamming power is inversely proportional to the square of the range to the radar, barrage jamming can adequately take care of remote enemy radars. Hence, with such a system the operating threshold sensitivity of the channel switches can be reduced so that fewer channels will be turned on, and hence greater jamming effectiveness will result.

From the above description it will be seen that the various objects of the invention have been achieved by the provision of a jamming system which is completely automatic in its operation. The jamming system has the advantage that it looks at all frequencies over its broad band of operation simultaneously through a short look-through period, and instantaneously selects the proper jamming signal frequency or frequencies to be radiated. By virtue of the novel circuit arrangement in which the receiver amplifier 10 is utilized as a noise generator source, a single set of band pass filters can be used for selecting and controlling the output jamming signal according to the frequency of the received input signal.

While the multiplexing arrangement has been described as including broad band travelling wave tube amplifiers with a series of band pass filters for channelizing the received radar signals, it is to be understood that the invention is not limited to this specific arrangement. For example, particularly at lower frequencies of operation, channelizing can be accomplished by a plurality of tuned r.f. amplifiers. Also the output r.f. amplifier 26 may be any suitable broad band amplifier, such as a distributed amplifier. Furthermore, although an extended delay gate has been described as a preferred type of gate to provide continuous jamming during the complete scanning cycle of a searching enemy radar, such type of gate is not essential to the operation of the circuit but any suitable gate for holding the switch closed for a portion of the transmission period as set by the gate generator 16 may be utilized.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus comprising broad band signal receiving and noise generating means, means for channelizing the output signals of said receiving and generating means according to the frequency content thereof, said channelizing means including a plurality of band pass filters tuned respectively to different frequency channels, means for gating the output of each of said filters including a detector coupled to the output of the associated filter, a switch coupled to the output of said associated filter, and means for closing said switch for a predetermined interval of time in response to an output signal above a predetermined level from the detector, broad band transmitting means, and means for combining and coupling the output signals of said gating means to the transmitting means, whereby the transmitting means produces an output signal having a frequency band coextensive with that of the signal passed by the gating means.

2. Apparatus as defined in claim 1 further including broad band means for coupling a portion of the output power from the receiving means directly to the transmitting means, whereby a broad band low level signal is simultaneously transmitted with the channelized signal.

3. Apparatus as defined in claim 1 further including means for alternately interrupting transmission by said transmitting means and reception by said receiving means.

4. Apparatus comprising broad band signal receiving and noise generating means, means for channelizing the output of said receiving and generating means according to the frequency content thereof, individual means for gating the output of each frequency channel of said channelizing means, each said gating means being selectively rendered conductive in response to an output signal above a predetermined level from a respective frequency channel, broad band transmitting means, and means for combining and coupling the output signals of said gating means to the transmitting means, whereby the transmitting means produces an output signal having a frequency band coextensive with that of the signals passed by the gating means.

5. A jamming system comprising a broad band noise source, means for channelizing the output of the noise source into a plurality of output channels of different frequencies, broad band transmitting means, means including a plurality of switches, each switch selectively coupling a respective one of said output channels to said transmitting means, broad band signal receiving means, and means for selectively actuating each said switch in response to received signals of a frequency coextensive with that of said respective one of said output channels.

6. Apparatus as defined in claim 5 further including means for alternately interrupting reception by the receiving means and transmission by the transmitting means.

7. Apparatus comprising means for receiving radio signals over a broad frequency band and for generating noise over the same frequency band, channelizing means for dividing according to frequency content the received signals and noise signals into a plurality of output channels of different frequencies, broad band transmitting means, means including a plurality of switches, each switch selectively coupling a respective one of said output channels to said transmitting means, and means for selectively actuating each switch in response to a received signal of a frequency coextensive with that of said respective one of said output channels.

8. Apparatus as defined in claim 7 wherein said means for selectively actuating each switch includes means for maintaining the actuation of each switch for a predetermined interval following the occurrence of said received signal.

* * * * *